United States Patent
Lei et al.

(10) Patent No.: US 10,565,874 B1
(45) Date of Patent: Feb. 18, 2020

(54) METHOD AND APPARATUS FOR CELLULAR COMMUNICATION REDIRECT AND RELAY

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/189,570

(22) Filed: Nov. 13, 2018

(51) Int. Cl.
| G08G 1/0967 | (2006.01) |
| H04W 4/46 | (2018.01) |
| H04W 4/44 | (2018.01) |
| H04W 4/021 | (2018.01) |

(52) U.S. Cl.
CPC . *G08G 1/096791* (2013.01); *G08G 1/096783* (2013.01); *H04W 4/021* (2013.01); *H04W 4/44* (2018.02); *H04W 4/46* (2018.02)

(58) Field of Classification Search
CPC .................................. H04W 4/00; H04L 1/00
See application file for complete search history.

(56) References Cited

U.S. PATENT DOCUMENTS

| 7,747,291 B2 | 6/2010 | Himmelstein | |
| 9,736,847 B2 | 8/2017 | Feng et al. | |
| 2009/0311995 A1* | 12/2009 | Himmelstein | G06Q 10/10 455/414.1 |
| 2015/0195827 A1* | 7/2015 | Feng | H04W 4/046 380/270 |
| 2015/0304983 A1* | 10/2015 | Krening | H04W 64/003 370/254 |
| 2016/0337971 A1* | 11/2016 | Bhargava | H04B 7/15507 |
| 2017/0101054 A1* | 4/2017 | Dusane | G08G 1/096716 |

FOREIGN PATENT DOCUMENTS

| EP | 3076689 A1 | 10/2016 |
| WO | 2016209197 A1 | 12/2016 |

* cited by examiner

*Primary Examiner* — Shirley Lu
(74) *Attorney, Agent, or Firm* — Michael Spenner; Brooks Kushman P.C.

(57) ABSTRACT

A system includes a processor configured to receive a condition alert from a reporting vehicle on a first cellular network. The processor is also configured to compile a notification, including a condition and location identified from the condition alert and send the notification over the first cellular network and a plurality of other cellular networks, serviced by other providers different from a provider servicing the first cellular network, for receipt by vehicles using the other providers for cellular communication.

6 Claims, 5 Drawing Sheets

METHOD AND APPARATUS FOR CELLULAR COMMUNICATION REDIRECT AND RELAY

TECHNICAL FIELD

The illustrative embodiments generally relate to methods and apparatuses for cellular communication redirect and relay.

BACKGROUND

Many vehicles on the road include long-range communication capability, capable of communication with cloud servers and remote assistance providers. This can be very useful if a vehicle is involved in an accident, because the vehicle can request assistance via long-range communication.

If the vehicle involved in the accident suffers damage to long-range communication, however, or lacks such capability from the onset, the occupants will have to either use a phone to report the accident or rely on the assistance of others. The former poses a problem if the occupants lack phones or are rendered incapable of using the phones, and the latter poses a problem if no one passing-by bothers to report the accident.

SUMMARY

In a first illustrative embodiment, a system includes a processor configured to receive a condition alert from a reporting vehicle on a first cellular network. The processor is also configured to compile a notification, including a condition and location identified from the condition alert and send the notification over a plurality of other cellular networks, serviced by other cellular network providers different from a provider servicing the first cellular network, for receipt by vehicles using the other providers for cellular communication.

In a second illustrative embodiment, a method includes, in response to an accident, requesting assistance from passing vehicles in conveying an accident report, including broadcasting predefined accident data along with an initial assistance request. The method also includes receiving indication that a passing vehicle has conveyed the accident report to a remote assistance source and, responsive to the indication, ceasing broadcast of the initial assistance request.

In a third illustrative embodiment, a method includes receiving an assistance request from a damaged vehicle, relayed over a first cellular network through an undamaged vehicle having received the assistance request from the damaged vehicle. The method also includes preparing a response to the request and sending the response over the first cellular network and a plurality of other cellular networks to a plurality of receiving vehicles, including instructions for the receiving vehicles to broadcast the response.

DETAILED DESCRIPTION

Figure 1:
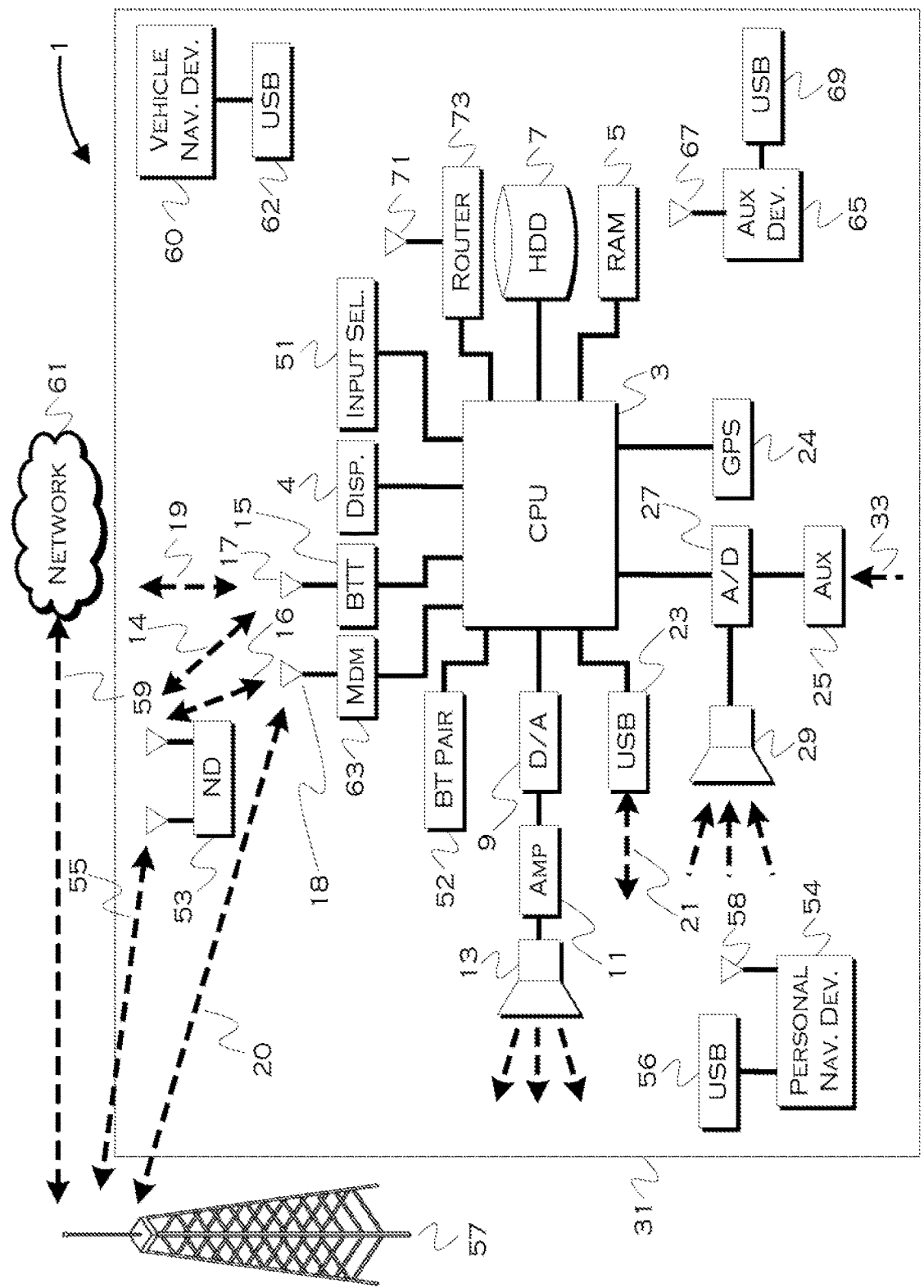
FIG. 1 shows an illustrative vehicle computing system.

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

By providing a relay solution, leveraging multi-network relay and V2V communication for non-cellular-equipped vehicles, the illustrative concepts and embodiments provide opportunities to improve the utility and functionality of incident notification solutions. The novel, uncommon and atypical examples and concepts described herein demonstrate potential improvements achievable through use of those examples, concepts, and the like.

Many vehicles come equipped with telematics control units (TCUs) or other components that allow for remote communication. The TCUs often include an on-board cellular modem, and in some instances can also talk to wireless devices in a vehicle, and obtain connectivity in that manner. In either solution, however, some form of cellular connectivity is commonly required.

Inclusion of cellular modems in vehicles is a relatively recent development, and is often reserved for vehicles above a certain class. Use of these modems may also require a subscription to a cellular provider, and many owners may elect not to enable the modems, especially if the owner's in-vehicle device (e.g., phone) can be used by the vehicle to place a call or transfer data.

When a vehicle is in an accident, the vehicle may place an emergency call to a public safety access point (PSAP) using a number such as 911. This call allows the operator to speak directly with a vehicle occupant, and can also act as a data relay to convey information such as vehicle location, vehicle status, emergency system (e.g., airbag) deployment, etc.

If the vehicle owner has an active cellular modem that is not damaged in the accident, the vehicle can easily place the required call, assuming service for that modem is available. If the owner has not activated, or has deactivated, the modem, however, the call may not be possible via the modem. If the owner is relying on a brought-in device to provide service, and if the device loses power, or is damaged in the accident, the vehicle will not be able to place the call. In other instances, the owner may not even have cellular access in a less-expensive vehicle, but will still benefit from an ability to place an emergency communication.

Such connection services can also be used to report incidents or localized issues, such as a vehicle encountering a dangerous road condition. In this case, a cellular network could be used as a localized relay network, conveying the information to other network participants. Even in such a case, however, the relay would be limited to participants of the given network.

Because of the impending advent of autonomous vehicles, more and more vehicles are being provided with vehicle-to-vehicle (V2V) communication. In addition, it is common to include a BLUETOOTH or other short range wireless communication transceiver in a vehicle, as a way of playing music from brought-in devices, for example. In situations where a vehicle is incapable of placing a direct connection to an emergency operator, the vehicle may still be capable of enacting communication with other local vehicles.

The illustrative embodiments allow an accident-observing or accident-experiencing vehicle to leverage vehicle-to-vehicle communication to facilitate an emergency relay to a remote operator or emergency service, thus effectively at least conveying the fact and location of the emergency remotely, even though the vehicle itself may not necessarily be capable of conveying such information directly to the emergency service.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs of the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WI-FI and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WI-FI) or a WiMax network.

In one embodiment, incoming data can be passed through the nomadic device via a data-over-voice or data plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but is not limited to, personal media players, wireless health devices, portable computers, and the like.

Also, or alternatively, the CPU could be connected to a vehicle based wireless router 73, using for example a WI-FI (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Figure 2:
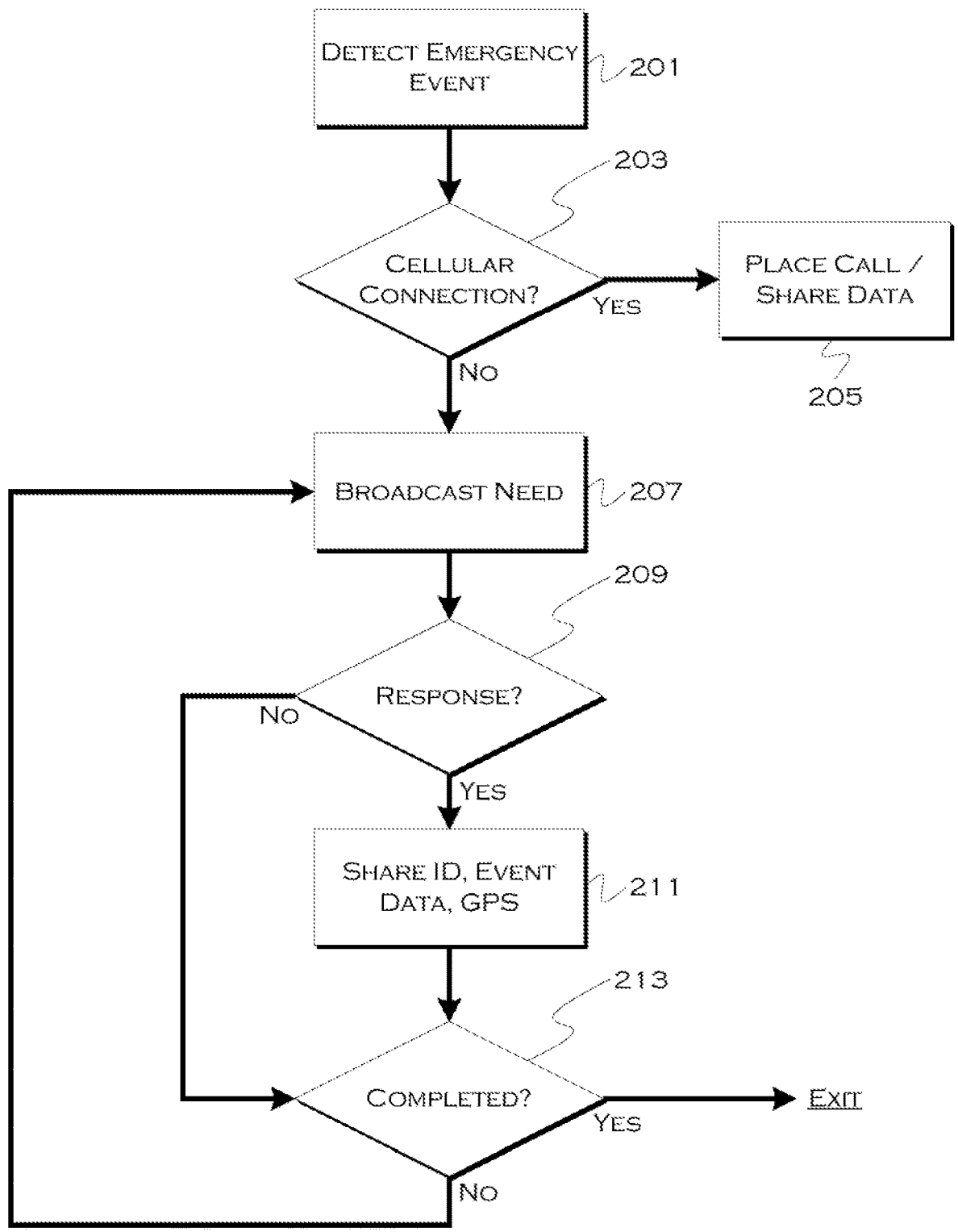
FIG. 2 shows an illustrative process for event broadcasting.

FIG. 2 shows an illustrative process for event broadcasting. In this illustrative example, an object-vehicle is involved in an accident. This event, or other reportable/shareable events, are events that may require remote assistance and/or public broadcast, and a vehicle lacking long-range communication capability may historically be incapable of fulfilling such a need. Even if the vehicle merely temporarily lacks long-range communication capability due to damage, the illustrative embodiments provide an alternative solution that can assist in such instances.

Responsive to the vehicle encountering or detecting an emergency event at 201, the vehicle can determine at 203 if a cellular connection is available and/or functioning. The events can include a directly experienced emergency (which will be the basis for many examples discussed herein) or an observed emergency or dangerous situation, which the vehicle may attempt to report.

If the vehicle has cellular communication, the vehicle can proceed at 205 with calling the PSAP or reporting the event to a cellular server/provider or to a centralized back-end server.

If the vehicle lacks a functioning cellular or other long-range connection, the process can instead use a short-range V2V communication format to broadcast at 207 a localized need for long-range connection. This is effectively an advertisement for a connection from the vehicle, whereby the vehicle is requesting connection assistance from local, passing vehicles. In other examples, all vehicles may broadcast availability, if any, for such connections, and a stranded or in-need vehicle could respond to those broadcasts with a connection attempt response.

It is worth noting that the local vehicle does not necessarily need to connect to a remote vehicle in a traditional manner, such as bi-directional communication. Vehicles move at high speeds relative to stopped objects, and a vehicle stranded on a highway may be unsuccessful in attempting to use short-range communication to establish a meaningful connection with a passing vehicle. Accordingly, the stranded vehicle can also simply broadcast some fundamental characteristics for receipt by passing vehicles, which can include, for example, a vehicle identifier (if a response message is requested), a GPS location and an incident identifier (which would be a shorthand code, for brevity's sake, such as a bit or bits set according to a type and priority of incident and requested response).

The vehicle can continue to broadcast the assistance request, in this example, until such time as a response at 209 is received. In this example, the response is a connection or confirmation from a passing vehicle that assistance can be rendered. At this point, via an established connection, the stranded or incident-observing vehicle can relay at 211 the relevant details such as, but not limited to, vehicle ID, event information and GPS location. In other examples, this may simply be part of the broadcast, and a response may indicate receipt of this information with intent to relay, if a response is provided at all.

If the vehicle receives a completion indication at 215, that may actually include a response from the PSAP, relayed as discussed later herein. In other examples, the completion indication may simply be a confirmation that a useful passing vehicle will or has relayed the request. It may be useful to have the vehicle cease broadcast before help actually arrives, responsive to a confirmation that the request has been relayed to and received by the PSAP, so that the single vehicle does not overwhelm the PSAP with relayed requests.

Figure 3:
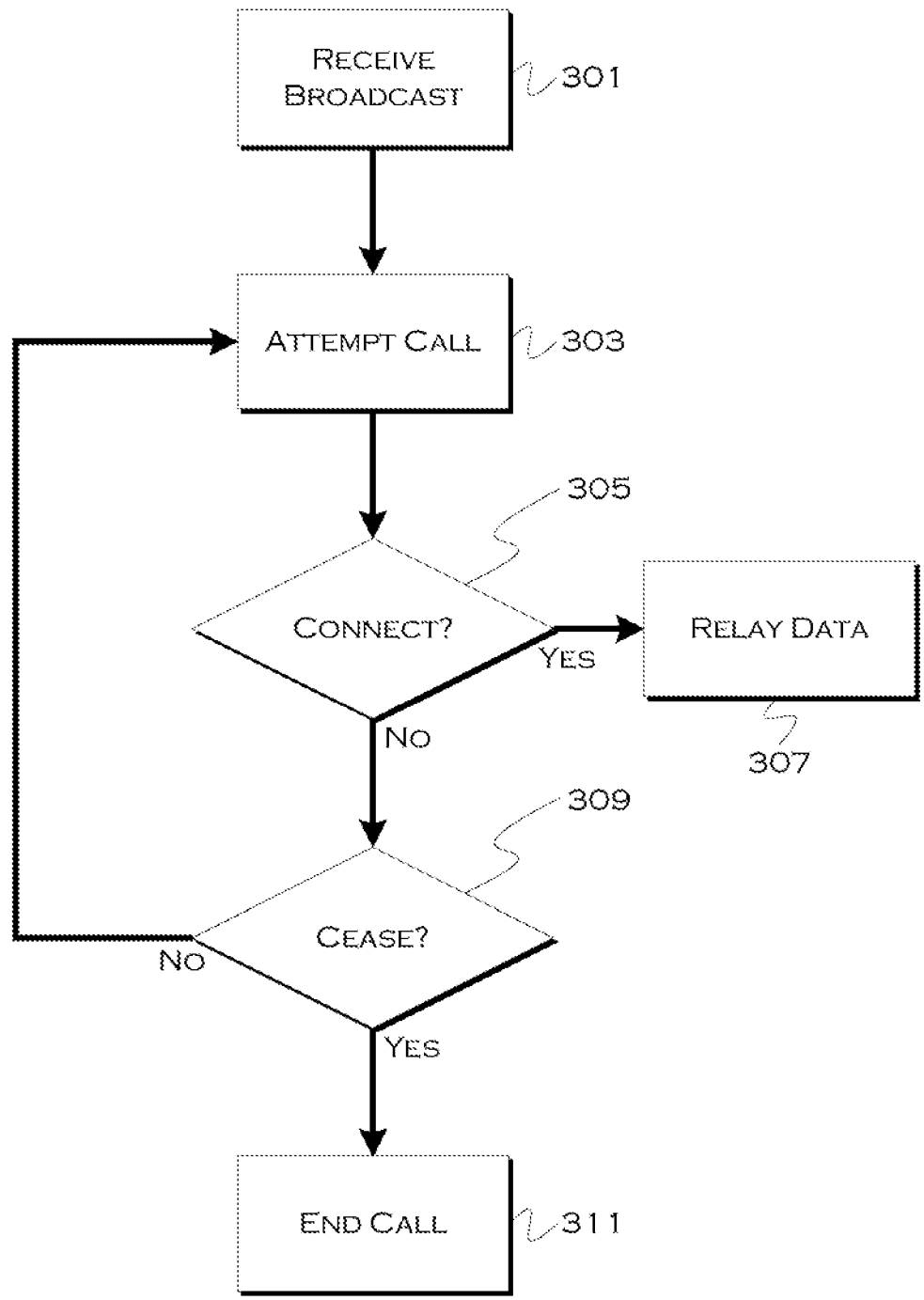
FIG. 3 shows an illustrative process for event relay.

FIG. 3 shows an illustrative process for event relay. In this illustrative example, passing vehicles (passing a reporting vehicle) will receive the request for help and attempt to relay the request to a PSAP using an on-board cellular connection. Passing vehicles which lack a cellular connection could still be used to relay request to other vehicles with cellular connections, or those types of passing vehicles could ignore the request. A broadcasting object vehicle may initially begin by requesting direct assistance from a cellular-enable passing vehicle, but if a certain time passes and no record of assistance is received, the process may change the request to also asking non-cellular-equipped vehicles to act as intermediary vehicles.

In this example, at 301 a cellular-equipped vehicle receives a request from an object vehicle, which in this example is a vehicle attempting to relay a request to a cellular network, because the object vehicle lacks connectivity with a given cellular network.

With regards to the idea of reporting observed dangerous conditions (e.g., a road wash-out, amber alert or identification, etc.), a vehicle could report directly to a cellular provider of the vehicle if the vehicle was so-enabled. This would be an effective way of conveying the report to a given provider network, but if a vehicle manufacturer was not also receiving the information and re-broadcasting the information to other cellular networks, and instead this was undertaken by the cellular provider, then the distribution of information may be limited to a given network. Under such a model, the vehicle might also attempt to redistribute the information to other passing vehicles who have different cellular providers, to increase distribution. Both the object vehicle and any receiving vehicles could also act in concert with local communication techniques to report the indecent to other non-cellular vehicles, in order to spread the report locally even when many vehicles lack cellular connections.

While it would be possible for a single object vehicle to rely on localized-communication for eventual distribution, in conjunction with any distribution over that vehicle's cellular network, by allowing other vehicles with other cellular providers to also distributed the information cellularly, each provider can quickly obtain the alert status and redistribute the information to that provider's subscribers. All those vehicles can then redistribute to other localized non-cellular equipped vehicles, and the information can be widespread very quickly. Even if the automotive OEM is providing redistribution of reports over varied cellular networks, the receiving vehicles can redistribute to non-cellular vehicles in a manner that effectively achieves a high degree of distribution.

In the example, shown, the process attempts to report the received incident to a PSAP, which involves the receiving vehicle attempting to make a call at 303. If the call connects at 305, the process can relay the data requested for relay at 307.

If the call does not connect (busy signal, bad service, etc.), the process can continue to attempt to connect until a cessation notice at 309 is received. When the PSAP confirms receipt of the call from one relay vehicle, this confirmation may be broadcast across a spectrum of cellular networks, to let all vehicles in vicinity of the object vehicle both know that the call was received and attempt to relay the response to the object vehicle. This can result in a cessation instruction for the other possible relay vehicles, so those vehicles stop attempting to call the PSAP, as well as a delivery instruction for the object vehicle in case one of those local vehicles should happen to drive within short range communication range of the object vehicle.

In this example, if the process receives the cessation instruction, at 311 the process may cease attempting the PSAP call. This vehicle can still attempt to relay the response to the object vehicle, but will no longer attempt to call the PSAP.

Figure 4:
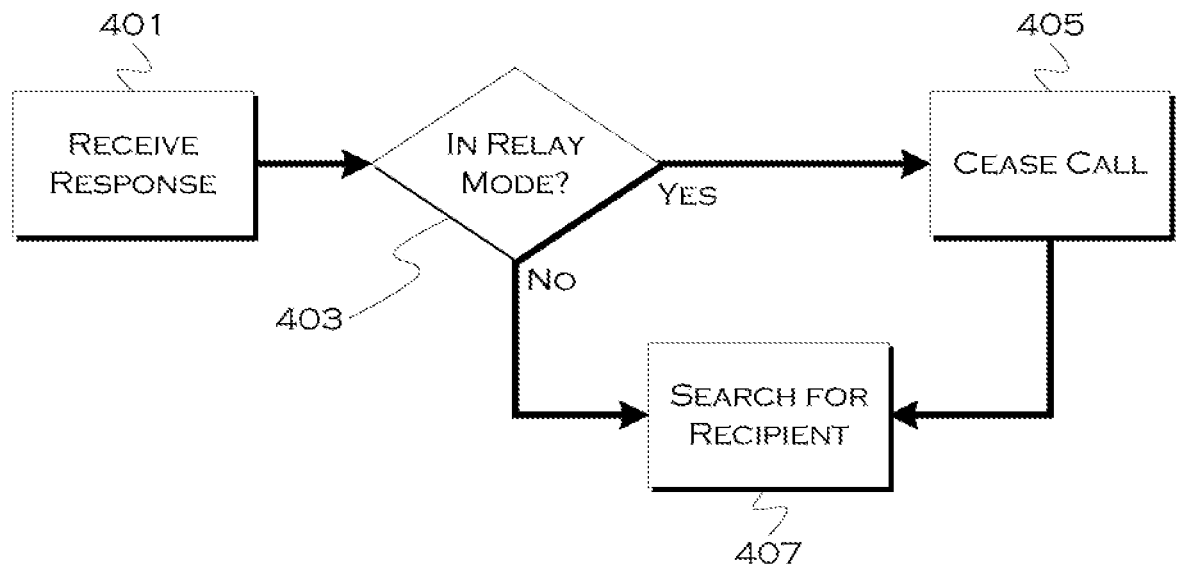
FIG. 4 shows an illustrative process for relay cessation.

FIG. 4 shows an illustrative process for relay cessation. In this example, the process receives, at 401, a response from the PSAP indicating a successful relay of the request. When the PSAP receives the relay request and a complete data set, the PSAP may send an instruction over a variety of cellular networks, both to inform vehicles to stop trying to call and to increase the chances of the response reaching the object vehicle.

This can effectively leverage a widespread distribution network to hit the localized target of the object vehicle, by using cellular networks, including those which did not place the original relay call, to redistribute the response in an attempt to reach the object vehicle. If the receiving vehicle is currently in relay mode at 403 (i.e., it is attempting to place a call), the process can instruct at 405 cessation of the call attempts. Otherwise, the vehicle will attempt to contact the object vehicle, if the vehicle is the locality of object vehicle coordinates as indicated by the PSAP response.

Vehicles can also relay data for reaching the object vehicle, by locally relaying the received response to all passing vehicles. Then, if any of those vehicles pass the object vehicle, the now-passing vehicle can relay the response to the object vehicle. In this manner, even vehicles lacking cellular connections can participate in attempting to relay the response to the object vehicle. Vehicles traveling in the locality (as indicated by road intersections, coordinates or other identifying information included in the PSAP response) can search at 407 for the object vehicle in order to deliver the response.

Figure 5:
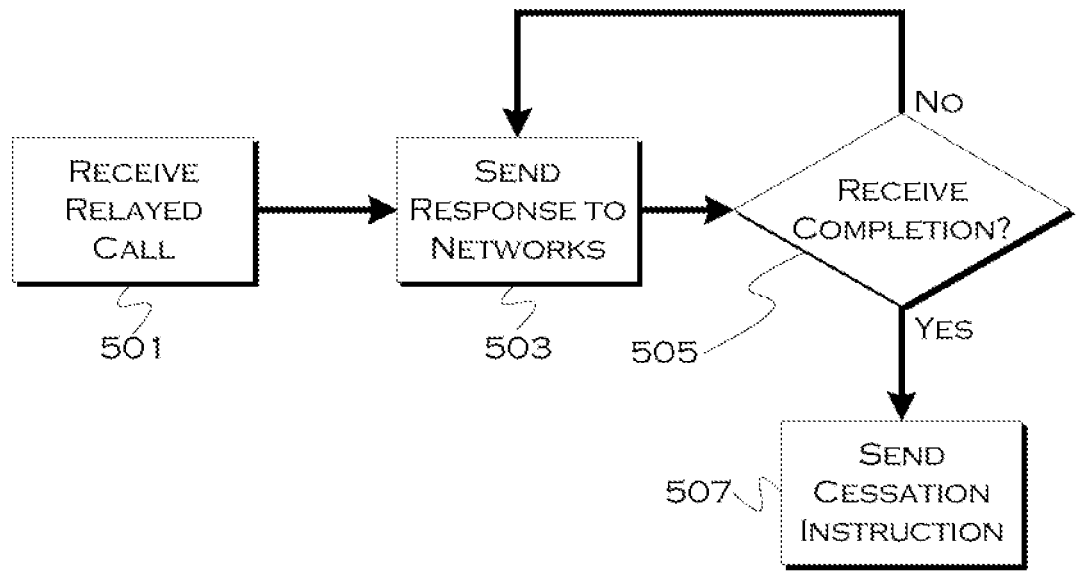
FIG. 5 shows an illustrative process for PSAP response.

FIG. 5 shows an illustrative process for PSAP response. In this illustrative example, the process can receive at 501 a relayed call from a vehicle passing the object vehicle, or having otherwise been relayed the call request originating from the object vehicle. Since the relaying vehicle is not providing ongoing communication with the object vehicle, the general intent is to obtain enough information from relay information so the PSAP can understand the situation. A relay message can be tagged with an identifier, in case multiple relay messages are sent, and once a given identified relay message is received, at 503 the PSAP can send messages to multiple cellular providers in the area of the object vehicle, requesting transfer of a response to the object vehicle.

If, at 505, the PSAP receives an indication that the response was successfully transferred, the PSAP can send at 507 a secondary instruction instructing cessation of relay of the response back to the object vehicle.

It may be useful to receive an update message from the object vehicle, if, for example, a situation worsens (e.g., the vehicle catches on fire). As such, the messages may be tagged with an ID, and receipt and processing of a given message may only result in request for cessation of the particular message. This avoids having a new message prevented by the cessation instruction relating to an earlier message, and this concept can relate to both cessation of the PSAP relays and the relays back to the object vehicle, both of which can take multiple forms over the course of single incident. For example, a first message may have message ID 1234, and once the PSAP responds to message 1234, a broadcast over the cellular networks can tell vehicles to stop sending message 1234 to the PSAP. But, if the requesting vehicle sends message 1235 because the vehicle caught fire, this message still needs to reach the PSAP, and so the cessation instruction (which is not necessary, but may decrease network traffic) would only cease relay of 1234.

Figure 6:
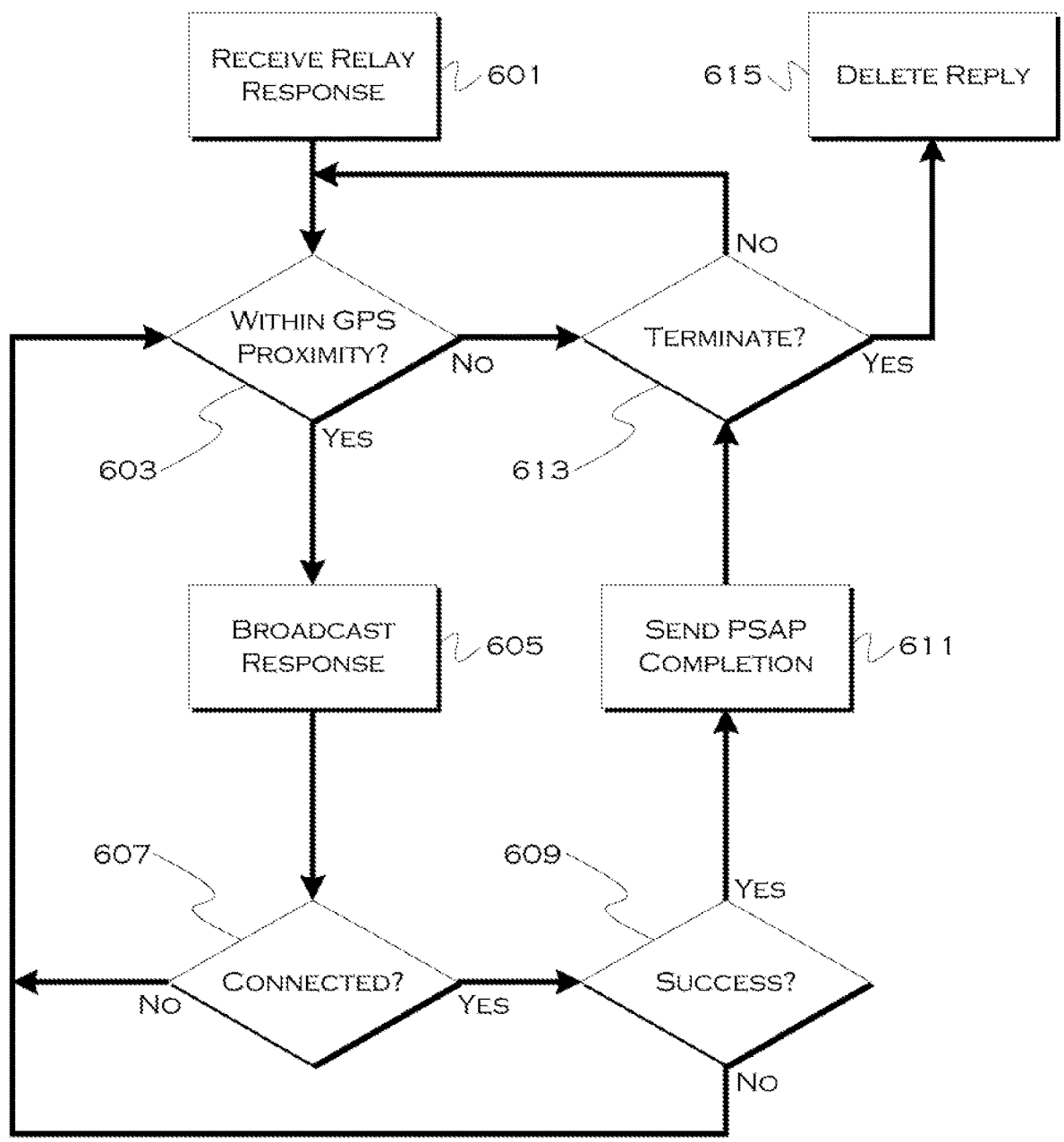
FIG. 6 shows an illustrative process for return-relay.

FIG. 6 shows an illustrative process for return-relay. In this example, the process receives, at 601, a relay response message from the PSAP. This message can be sent wide over a plurality of varied cellular and other networks in the vicinity of the object vehicle, in an attempt to maximize distribution. If the message originates from an information server (e.g., cellular or OEM information broadcast) and relates to an observed condition, similar protocol for widespread distribution in the locality of the observed condition can be used.

The process receives the response and (in this case, where the message has an explicitly identified recipient), the process determines at 603 whether the receiving vehicle is in a locality of the object vehicle. The locality can be identified by a road-location, cross road location, GPS location, etc. If the receiving vehicle is not in the vicinity of the object vehicle, the process may continue to attempt this check until, at 613, a cessation message relating to cessation of the relay response is received. At that point, the process at 615 can cease attempting to relay the response and delete the reply.

In some examples, the response can include relay instructions instructing the receiving vehicle at 605 to broadcast the response when in proximity (e.g., short-range wireless communication range) of the accident location. Because relay may be relied upon for the message to reach the object vehicle, however, the response may be broadcast by all receiving vehicles within a larger range, such that relay is used to reach the vehicle as opposed to direct communication from a first receiving vehicle. For example, the process could respond to a first vehicle, which could immediately begin broadcasting the response, which would then pass through a chain of short range V2V transfers until eventually reaching the object vehicle. Thus, an instruction to broadcast the response may be set at several miles or more from the accident location (e.g., a radius), even though the immediate broadcast will not then reach the location directly.

Once a vehicle is connected at 607, and the message has been successfully sent at 609, the process can wait for a PSAP response. Once the PSAP has responded, the vehicle can send 611 the PSAP response to the broadcasting vehicle (indicating success of transmission) and the process can terminate at 611.

Messages sent responsively (to a received report) over the cellular networks can also include identification of intended receiving vehicles. This could be based on only sending the response to certain cells, or, for example, by including a header with GPS coordinates designating whether a receiving vehicle should read the response or ignore it. This effectively defines a geo-fence under which the response should be received. The receiving vehicle may also read the response if, for example, a planned route, or heading on current road, will carry the vehicle within the boundaries defined by the GPS coordinates (e.g., it will eventually become a "useful" recipient for purposes of conveying the response to or near the object vehicle).

By using V2V communication to relay messages to vehicles lacking cellular communication, as well as using multi-network relay/broadcast to relay an observed event, conveyed through a single network originally, the illustrative embodiments improve and speed communication of these events, and make it possible for vehicles having missing or damaged cellular communication to communicate with remote assistance providers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A method comprising:
receiving an assistance request from a damaged vehicle, damaged so as to be unable to receive cellular communication, relayed over a first cellular network through an undamaged vehicle having received the assistance request from the damaged vehicle;
preparing a response to the request; and
sending the response over the first cellular network and a plurality of other cellular networks to a plurality of receiving vehicles, that process the response based on receiving vehicle coordinates being within a predefined proximity of damaged vehicle location coordinates, as indicated in the response, including instructions for the receiving vehicles to broadcast the response.

2. The method of claim 1, wherein the predefined proximity is defined by a geofence included in the response and where the receiving vehicle coordinates are within the geofence.

3. A method comprising:
receiving an assistance request from a damaged vehicle, damaged so as to be unable to receive cellular communication, relayed over a first cellular network through an undamaged vehicle having received the assistance request from the damaged vehicle;
preparing a response to the request; and
sending the response over the first cellular network and a plurality of other cellular networks to a plurality of receiving vehicles, that receive and process the response based on receiving vehicle planned coordinates, correlating to at least one location projected to be upcoming for the given receiving vehicle, being within a predefined proximity of damaged vehicle location coordinates, as indicated in the response, including instructions for the receiving vehicles to broadcast the response.

4. The method of claim 3, wherein vehicle planned coordinates include coordinates on a current route of the receiving vehicle passing within a predefined proximity to the damaged vehicle location.

5. The method of claim 3, wherein vehicle planned coordinates includes coordinates upcoming along a current heading along a current road carrying the receiving vehicle within a predefined proximity to the damaged vehicle location.

6. A method comprising:
   receiving an assistance request from a damaged vehicle, damaged so as to be unable to receive cellular communication, relayed over a first cellular network through an undamaged vehicle having received the assistance request from the damaged vehicle;
   preparing a response to the request; and
   sending the response over the first cellular network and a plurality of other cellular networks to a plurality of receiving vehicles, including instructions for the receiving vehicles to broadcast the response when the receiving vehicle's GPS coordinates indicate that the receiving vehicle is in predefined proximity to a location of the damaged vehicle as indicated in the response.

* * * * *